United States Patent
Willis et al.

(10) Patent No.: US 11,598,203 B2
(45) Date of Patent: Mar. 7, 2023

(54) REDUCING RESONANT NOISE IN SEISMIC DATA ACQUIRED USING A DISTRIBUTED ACOUSTIC SENSING SYSTEM

(71) Applicant: Halliburton Energy Services, Inc., Houston, TX (US)

(72) Inventors: Mark Elliott Willis, Katy, TX (US); Oscar Augusto Barrios Lopez, Conroe, TX (US); Pedro William Palacios, Katy, TX (US); Dongjie Cheng, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 725 days.

(21) Appl. No.: 16/564,181

(22) Filed: Sep. 9, 2019

(65) Prior Publication Data
US 2020/0102821 A1 Apr. 2, 2020

Related U.S. Application Data

(60) Provisional application No. 62/738,761, filed on Sep. 28, 2018.

(51) Int. Cl.
| | | |
|---|---|---|
| E21B 49/00 | (2006.01) | |
| G01V 1/32 | (2006.01) | |
| G01V 1/36 | (2006.01) | |
| G01V 1/37 | (2006.01) | |

(52) U.S. Cl.
CPC ............... *E21B 49/00* (2013.01); *G01V 1/32* (2013.01); *G01V 1/366* (2013.01); *G01V 1/37* (2013.01)

(58) Field of Classification Search
None
See application file for complete search history.

(56) References Cited

U.S. PATENT DOCUMENTS

| | | |
|---|---|---|
| 2009/0141943 A1 | 6/2009 | Liu |
| 2012/0092960 A1 | 4/2012 | Gaston et al. |
| 2013/0167628 A1 | 7/2013 | Hull et al. |
| 2014/0205201 A1 | 7/2014 | Sugiura et al. |
| 2016/0252651 A1* | 9/2016 | Ellmauthaler ........... G01V 1/48 356/72 |
| 2017/0090054 A1* | 3/2017 | Willis ..................... G01V 1/42 |
| 2017/0235006 A1 | 8/2017 | Ellmauthaler et al. |

(Continued)

FOREIGN PATENT DOCUMENTS

| | | |
|---|---|---|
| WO | 2020068326 A1 | 4/2020 |
| WO | 2020236179 A1 | 11/2020 |

OTHER PUBLICATIONS

Sudhish K. Bakku, Peter Wills, Michael Fehler, Jeff Mestayer, Albena Mateeva, Jorge Lopez; Vertical Seismic Profiling Using Distributed Acoustic Sensing in a Hydrofrac Treatment Well (Year: 2014).*

(Continued)

*Primary Examiner* — Lina M Cordero
(74) *Attorney, Agent, or Firm* — Delizio, Peacock, Lewin & Guerra

(57) ABSTRACT

A distributed acoustic sensor is positioned within a wellbore of a geologic formation. Seismic waves are detected using the distributed acoustic sensor. A raw seismic profile is generated based on the detected seismic waves. Resonant noise is identified and reduced in seismic data associated with the raw seismic profile.

20 Claims, 13 Drawing Sheets

(56) References Cited

U.S. PATENT DOCUMENTS

2017/0307772 A1* 10/2017 Jutila .................. G01V 1/42
2017/0342814 A1* 11/2017 Krueger .............. G01H 9/004
2020/0271811 A1* 8/2020 Wilson ................ G01V 1/48

OTHER PUBLICATIONS

Sudhish K. Bakku, Peter Wills, Michael Fehler, Jeff Mestayer, Albena Mateeva, Jorge Lopez; Vertical Seismic Profiling Using Distributed Acoustic Sensing in a Hydrofrac Treatment Well, Abstract (Year: 2014).*
PCT Application Serial No. PCT/US2019/050234, International Search Report, dated Dec. 26, 2019, 3 pages.
PCT Application Serial No. PCT/US2019/050234, International Written Opinion, dated Dec. 26, 2019, 5 pages.
Willis, et al., "Understanding Cable Coupling Artifacts in Wireline-Deployed DAS VSP Data", SEG International Exposition and 89th Annual Meeting, 2019, 5 pages.

* cited by examiner

REDUCING RESONANT NOISE IN SEISMIC DATA ACQUIRED USING A DISTRIBUTED ACOUSTIC SENSING SYSTEM

RELATED DISCLOSURE

This disclosure claims the benefit of priority under 35 U.S.C. § 119(e) of U.S. Provisional Application No. 62/738,761, filed Sep. 28, 2018 entitled "Resonant Noise Reduction for Distributed Acoustic Sensing Data", the contents of which are herein incorporated by reference in its entirety.

FIELD OF USE

This disclosure generally relates to a distributed acoustic sensing (DAS) system associated with seismic monitoring of a geologic formation, and more particularly to reducing resonant noise in seismic data acquired using the DAS system.

BACKGROUND

A number of different operations are used to extract hydrocarbons from a geologic formation which include drilling a wellbore through and/or into the geologic formation at a desired well site, fracturing the wellbore, and pumping the hydrocarbons which flow into the wellbore to the surface of the geologic formation. Some or all of these operations are conducted based on seismic monitoring of the geologic formation. Vertical seismic profiling (VSP) is a measurement technique used for seismic monitoring of the geologic formation. There are many different types of VSP with most sharing the characteristic that a seismic sensor system is disposed in a wellbore. A distributed acoustic sensing (DAS) system is one type of seismic sensor system utilized for VSP. The DAS system utilizes a downhole distributed acoustic sensor such as optical fibers as sensing elements to detect seismic waves incident on the distributed acoustic sensor resulting from an acoustic source outputting acoustic energy at or near the surface of the wellbore. The DAS system typically utilizes Rayleigh backscatter of laser light energy to spatially detect deformation (often referred to as strains) distributed along the optical fibers. The backscattered light is processed to determine light phase differences caused by the strains and changes in the strain along the optical fiber which turn is translated to measurements of the seismic waves incident on the distributed acoustic sensor at different depths in the wellbore and seismic data. The seismic data is used to determine rock properties in the geologic formation, such as where hydrocarbon is present in the geologic formation. In some cases, the seismic data might include undesirable resonant noise artifacts such as ringing. The undesirable resonant noise hinders analysis of seismic data and operational decisions made based on the analysis.

BRIEF DESCRIPTION OF THE DRAWINGS

Embodiments of the disclosure may be better understood by referencing the accompanying drawings.

DESCRIPTION

Figure 1:
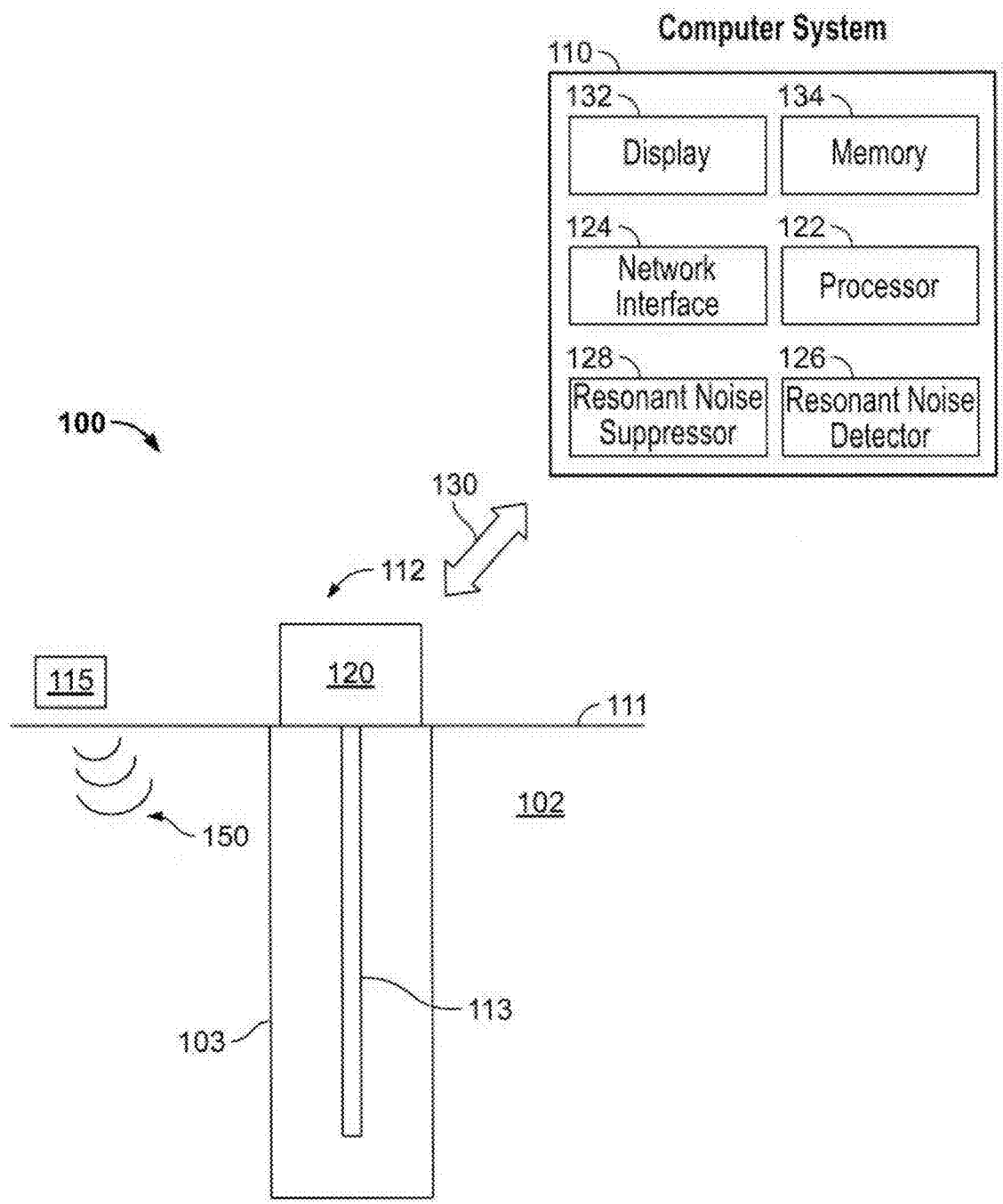
FIG. 1 depicts an example well logging system that includes a distributed acoustic sensing (DAS) system for collecting seismic data and a computer system for reducing resonant noise in the seismic data.

The description that follows includes example systems, methods, techniques, and program flows that embody aspects of the disclosure. However, it is understood that this disclosure may be practiced without these specific details. For instance, this disclosure refers to reducing resonant noise in seismic data acquired using distributed acoustic sensing (DAS) systems associated with seismic monitoring of a geologic formation in illustrative examples. Aspects of this disclosure can also be applied to any other type of sensing. In other instances, well-known instruction instances, protocols, structures and techniques have not been shown in detail in order not to obfuscate the description.

Overview

First breaks are seismic waves initially incident on optical fiber associated with a distributed acoustic sensing (DAS) system located downhole in a wellbore of a geologic formation. In some examples, these first breaks produce resonant noise in the seismic data such as a ringing or zig-zag noise. The resonant noise may be due to reverberation of the optical fiber downhole resulting from the seismic waves incident on the optical fiber, among other reasons. The resonant noise masks the seismic data associated with rock properties in the geologic formation.

Embodiments described herein are directed to reducing this resonant noise. The resonant noise is reduced in a time domain representation of the seismic data and/or in a frequency domain representation of the seismic data. In examples, regions with a varying pattern of signal amplitudes indicative of the resonant noise are identified in the time domain representation of the seismic data. The regions associated with the resonant noise are adjusted by muting signal amplitudes to reduce the resonant noise in the time domain representation of the seismic data. In examples, signal amplitudes which exceed a threshold level indicative of the resonant noise are identified in the frequency domain representation of the seismic data. Then, the resonant noise is reduced in the time domain representation of the seismic data based on the identified signal amplitudes in the frequency domain representation of the seismic data. In examples, the resonant noise may be adjusted in the frequency domain representation of the seismic data instead of reducing the resonant noise in the time domain representation of the seismic data. The signal amplitudes in the frequency domain representation are muted and/or amplitude balanced. Then, the adjusted frequency domain representation of the seismic data is converted into the time domain to generate the time domain representation of the seismic data with reduced resonant noise.

Various embodiments provide improved data quality of a raw seismic profile. The reduction the resonant noise facilitates use of the raw seismic profile to determine of rock properties in the geologic formation, drill the wellbore, fracture rock in the geologic formation, and/or perform perforation operations, well flooding, and/or pumping operations to recover hydrocarbon from the geologic formation.

Example System

FIG. 1 depicts an example well logging system 100 associated with seismic monitoring of a geologic formation and a computer system 110 for reducing resonant noise in seismic data.

The well logging system 100 includes a seismic source 115 and a distributed acoustic sensor (DAS) system 112. The seismic source 115 outputs acoustic energy 150 at or near a surface 111 of a geologic formation 102. The seismic source 115 may include one or more of explosives (e.g., dynamite), air guns, thumper trucks, a seismic vibrator (e.g., vibroseis), and other technologies which inject acoustic waves into the geologic formation 102. A DAS system 112 may include an optical fiber 113 in the geologic formation 102 and a DAS interrogator 120 to perform distributed acoustic sensing of acoustics resulting from the injected acoustic energy. The acoustic energy is sensed by a strain on the optical fiber 113. The strain is also indicative of seismic waves produced in the geologic formation 102 by the acoustic energy. In this regard, the recorded acoustic energy is also indicative of the seismic waves produced in the geologic formation 102 and the DAS system 112 also senses the seismic waves. The DAS interrogator 120 of the DAS system 112 may be located at or near the surface 111 while the optical fiber 113 of the DAS system 112 may be positioned downhole in the wellbore 103 in various ways as described in FIG. 2-4. In other examples, the DAS interrogator 120 may be located downhole.

The optical fiber may be a multimode and/or single mode optical fiber. In some examples, the optical fiber 113 may be secured in place in the wellbore 103 by the use of multiple fasteners. Further, although a single optical fiber 113 is illustrated in FIG. 1, a suitable number of optical fibers may be placed adjacent to the wellbore 103. In some examples, the optical fiber 113 may have a protective sheathing to protect the optical fiber 113 from corrosive wellbore fluids and elevated temperatures and pressures while providing direct mechanical coupling to the optical fiber 113 to facilitate the distributed acoustic sensing of the seismic waves.

The DAS interrogator 120 can be directly coupled to the optical fiber 113. Alternatively, the DAS interrogator 120 can be coupled to a fiber stretcher module (not shown) in the DAS system 112, wherein the fiber stretcher module is coupled to the optical fiber 113. The DAS interrogator 120 may have a laser which pulses laser light down the optical fiber. The optical fiber 113 produces response data indicative of strain at various locations along the optical fiber 113 resulting from the seismic waves incident on the optical fiber 113 such as backscattered light. The computer system 110 may be communicatively coupled to the DAS system 112 via a communication path 130 taking the form of a wired or wireless connection. The computer system 110 (or more generally an information handling system) which may be located on the surface 111 (as shown) or downhole may have a processor 122, memory 134, a network interface 124, a resonant noise detector 126, and a resonant noise suppressor 128. The network interface 124 may establish incoming communication channels with the DAS system 112 to receive the response data (e.g., Rayleigh backscatter data corresponding to Raleigh backscatter phenomena) caused in part by imperfections in the optical fiber 113 as the seismic waves causes transient deformation (e.g., stretching) of the optical fiber 113. The processor 122 and memory 134 are used to analyze the response data to generate seismic data indicative of a depth where the seismic waves impinged the optical fiber 113. For example, the seismic data is identified by detecting or otherwise determining phase changes in the backscattered light, referred to alternately as a backscatter response, along the length of the optical fiber 113. The seismic data may be used to determine rock properties in the geologic formation 102, such as where hydrocarbon is present in the geologic formation 102, to facilitate subsequent drilling of the wellbore 103, fracturing of rock in the geologic formation 102, perforation operations, well flooding, and/or pumping operations to recover the hydrocarbon from the geologic formation 102.

The seismic waves initially incident on the optical fiber 113 are referred to as first breaks. In some examples, these first breaks may produce resonant noise in the seismic data such as a ringing or zig-zag noise. The resonant noise may be due to reverberation of the optical fiber 113 resulting from the seismic waves incident on the optical fiber 113 where it is not secured to the wellbore 103, among other reasons. The resonant noise may mask seismic data associated with the rock properties in geologic formation 102. The computer system 110 may reduce this resonant noise.

The resonant noise detector 126 may detect resonant noise in the seismic data and the resonant noise suppressor 128 may reduce the resonant noise from the seismic data in accordance with the processes described herein. In some examples, the network interface 124 may transmit the noise reduced seismic data to a remote location and/or display the noise reduced seismic data on a display device 132 of the computer system 110. The resonant noise detector 126 and resonant noise suppressor 128 may be configured, using any combination of coded software, firmware, and/or hardware. In some examples, the network interface 124 may receive seismic data from a data center or storage server in which the seismic data from the DAS system 112 were previously stored which is then processed by the computer system 110.

Figure 2:
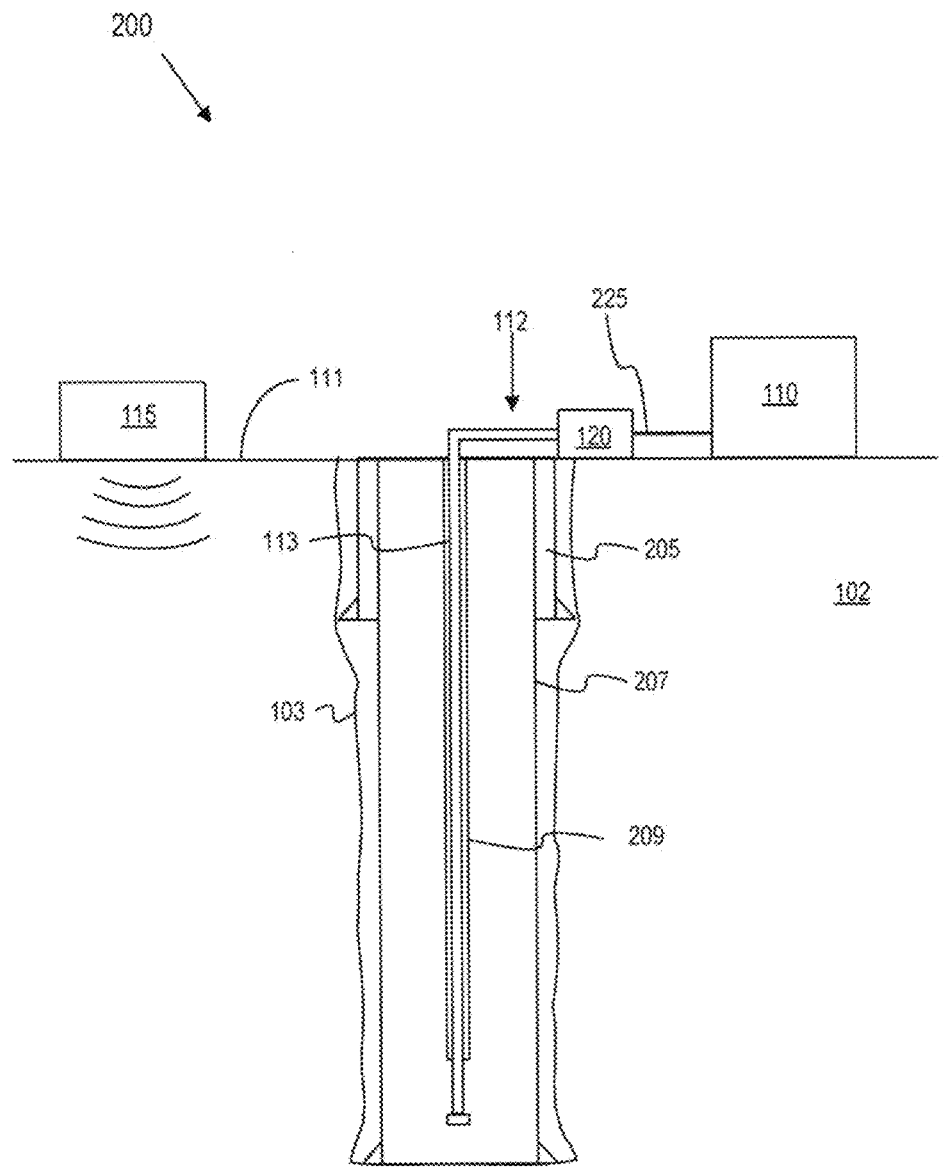
FIG. 2 depicts an example well logging system that includes a conveyance and a fiber optic cable for DAS.
Figure 3:
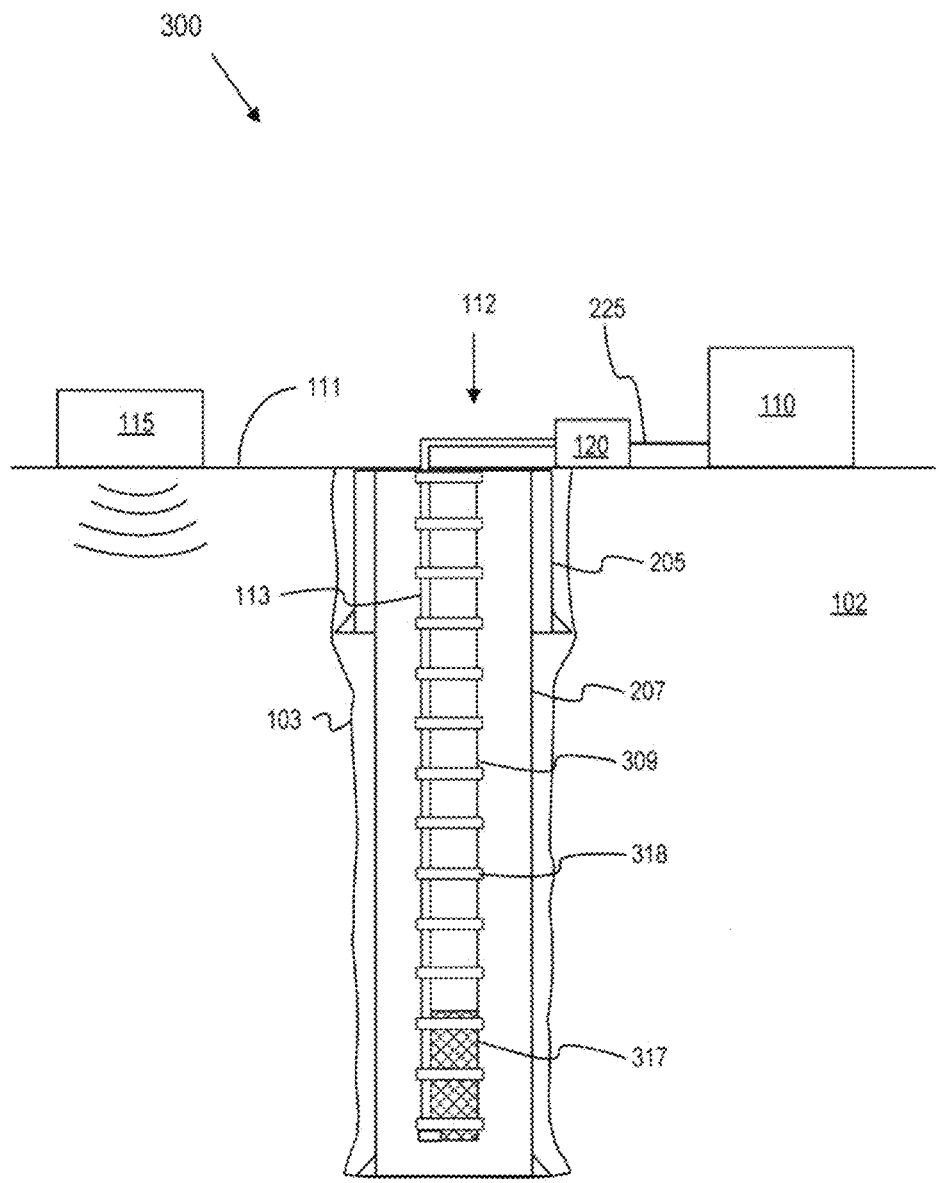
FIG. 3 depicts an example well logging system that includes a fiber optic cable for DAS that is fixed to the outside of a tubing.
Figure 4:
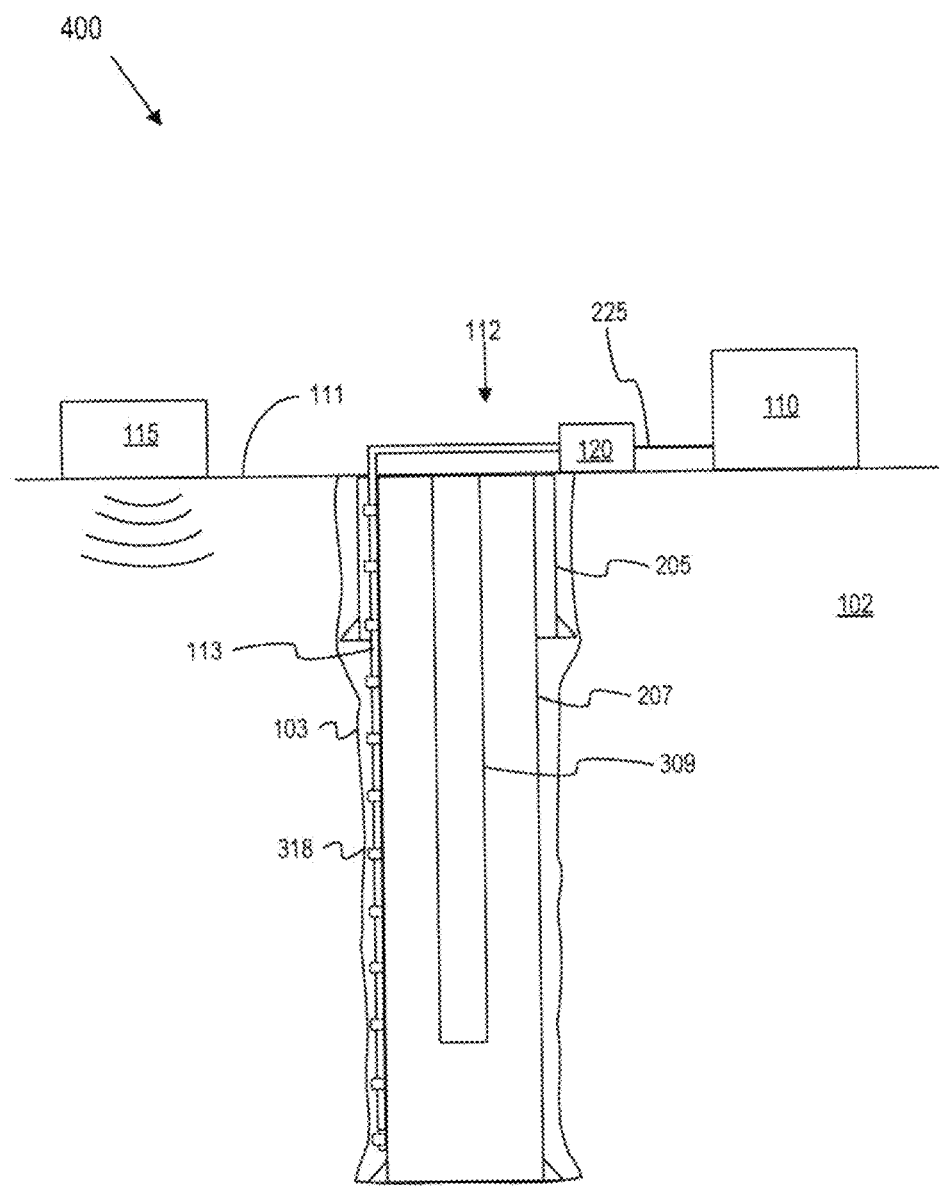
FIG. 4 depicts an example well logging system that includes a fiber optic cable for DAS that is fixed to the outside of a casing of a cased wellbore.

FIGS. 2-4 illustrate further variations of the well logging system shown in FIG. 1. In the variations, similar components are referenced by similar reference numbers. For example, reference number 113 which refers to an optical fiber in FIG. 1 is similarly referred to as 113 in FIGS. 2-4 respectively. The use of similar reference numbers is provided for ease of understanding. Similar reference numbers do not imply that the similarly referenced components have similar structure.

FIG. 2 depicts an example well logging system 200 that includes a conveyance and an optical fiber for DAS, according to some embodiments. The well logging system 200 can detect acoustic energy generated by a seismic source 115 at/near the Earth's surface 111. A wellbore 103 is drilled in a geologic formation 102. The wellbore 103 can be a completion well (i.e. a well ready for production or injection following a drilling process) having a surface casing 205, a production casing 207 inside the surface casing 205, and a conveyance 209 inside the production casing 207. In some embodiments, the conveyance 209 can be a wireline, a slickline, armored wireline, coiled tubing, work string, threaded pipe, etc. Although not depicted, a hoist may be used to run the conveyance 209 into the wellbore 103 which is disposed on a recovery vehicle. The hoist may be used, for example, to raise and lower wireline conveyance 209 in the wellbore 103.

The well logging system 200 includes an optical fiber 113 included within or connected to the conveyance 209. The optical fiber 113 may be part of a DAS system 112 which comprises a DAS interrogator 120 and the optical fiber 113 in the conveyance 209. The DAS interrogator 120 can be electrically connected to a connector 225 to provide DAS measurements of strain to the computer system 110. With the optical fiber 113 positioned inside a portion of the wellbore 103, the DAS system 112 can obtain information associated with the geologic formation 102 based on seismic/acoustic disturbances (e.g. seismic disturbances caused by the seismic source 115). Relative to other positions described below, having the optical fiber 113 to be within or connected to the conveyance 209 makes the DAS measurements sensitive to changes in the conveyance 209 (e.g., physical changes to the conveyance 209) and its surroundings (e.g., changes in fluid flow and/or composition along the conveyance 209).

FIG. 3 depicts an example well logging system 300 that includes an optical fiber for DAS that is fixed to the outside of a tubing disposed within a cased wellbore, according to some embodiments. The well logging system 300 can detect seismic disturbances generated by a seismic source 315 at/near the Earth's surface 111. As in previously described embodiments, the wellbore 103 has been drilled in the geologic formation 102. The wellbore 103 can be a completed well (i.e. a well ready for production or injection following a drilling process) having a surface casing 205, a production casing 207 inside the surface casing 205, and a tubing 309 inside the production casing 207. In some embodiments, the tubing 309 can be a casing string, production string, or a work string, etc. The well logging system 300 includes an optical fiber 113 that is fixed to the outer perimeter of the tubing 309. Cross-coupling protectors such as a cross-coupling protector 318 can be used to fix the optical fiber 113 to the tubing 309. In addition, a tubing tail 317 can also be fixed to the optical fiber 113 and extend below the bottom of the tubing 309.

The optical fiber 113 may be part of a DAS system 112 which comprises a DAS interrogator 120 and the optical fiber 113. The DAS interrogator 120 can be electrically connected to a connector 225 to provide DAS measurements of strain to the computer system 110. With the optical fiber 113 positioned at the outer perimeter of the tubing 309, the DAS system 112 can obtain information associated with the geologic formation 102 based on seismic/acoustic disturbances (e.g. seismic disturbances caused by the seismic source 115). Relative to other positions, fixing the optical fiber 113 to the outer perimeter of the tubing 309 makes the DAS measurements sensitive to changes in the annular region between the production casing 207 and the tubing 309.

FIG. 4 depicts an example well logging system 400 that includes an optical fiber 113 for DAS fixed to the outside of the casing of the cased wellbore, according to some embodiments. The well logging system 400 can detect seismic disturbances generated by a seismic source 115 at/near the Earth's surface 111. A wellbore 103 has been drilled in the geologic formation 102. The wellbore 103 can be a completed well (i.e. a well ready for production or injection following a drilling process) having a surface casing 205, a production casing 207 inside the surface casing 205, and a tubing 309 inside the production casing 207. In some embodiments, the tubing 309 can be a casing string, production string, or a work string, etc. The well logging system 400 includes an optical fiber 113 that is fixed to the outer perimeter of the production casing 207. Cross-coupling protectors such as a cross-coupling protector 318 can be used to fix the optical fiber 113 to the outer perimeter of the production casing 207.

The optical fiber 113 may be part of a DAS system 112 which comprises a DAS interrogator 120 and the optical fiber 113. The DAS interrogator 120 can be electrically connected to a connector 225 to provide DAS measurements of strain to the computer system 110. With the optical fiber 113 positioned at the outer perimeter of the production casing 207, the DAS system 112 can obtain information associated with the geologic formation 102 based on seismic/acoustic disturbances (e.g. seismic disturbances caused by the seismic source 115). Relative to other positions, fixing the optical fiber 113 to the outer perimeter of the production casing 207 can increase the sensitivity of DAS measurements to changes in the formation resulting from the seismic source outputting the acoustic energy.

Modifications, additions, or omissions may be made to the well logging systems 100-400 of FIGS. 1-4. For example, the DAS systems may be used during wireline or slickline logging operations before some or all of the tubulars have been secured within the wellbore, and/or before the wellbore is completed. As another example, multiple seismic sources may be used in conjunction with the well logging system and the DAS system. Other modifications, additions, or omissions may be made as well.

Figure 5:
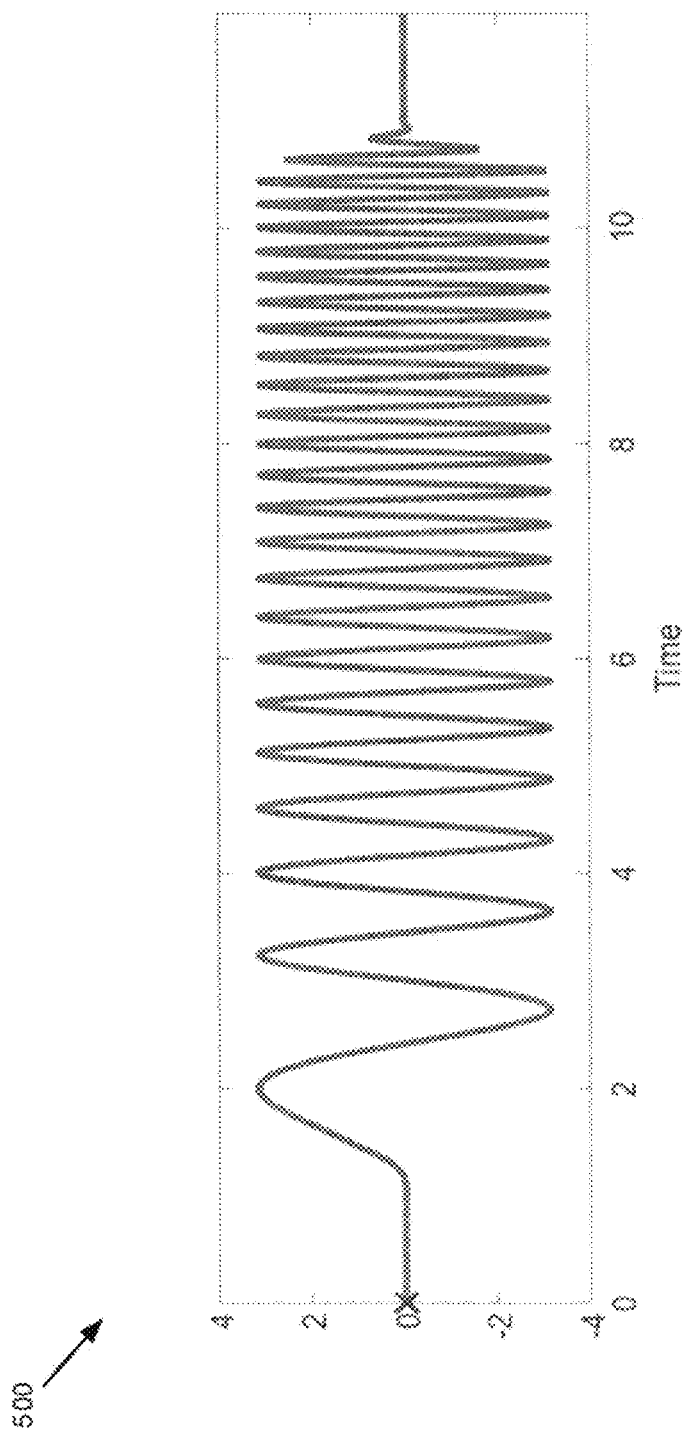
FIG. 5 depicts an example acoustic signal input into a geologic formation for DAS.

FIG. 5 depicts an example of the acoustic energy output by the seismic source into the geologic formation which produces the seismic waves incident on the optical fiber 113. The acoustic energy may take the form of a signal sweep 500 of acoustic energy of varying amplitudes whose frequency initially starts at very low frequency and increases over time. In this example, the signal sweep 500 is an up sweep in which the frequency increases over time. In other examples, the signal sweep can be a down sweep in which the frequency decreases over time. Further, the sweep may be a linear sweep over a range of frequencies, a non-linear sweep over a range of frequencies, and/or a combination of the linear sweep and non-linear sweep over a range of frequencies. In some examples, the signal sweep 500 may be repeated a plurality of times by the acoustic source, known as stacking the signal sweep 500. In some examples, the sweep frequency sets up an oscillation in the optical fiber based on the seismic waves incident on the optical fiber due to poor attachment of the optical fiber onto the conveyance, among other reasons. The oscillation produces resonant noise in the seismic data such the ringing and zig-zag noise, which is then removed in accordance with the processes described herein.

Example Operations

Figure 6:
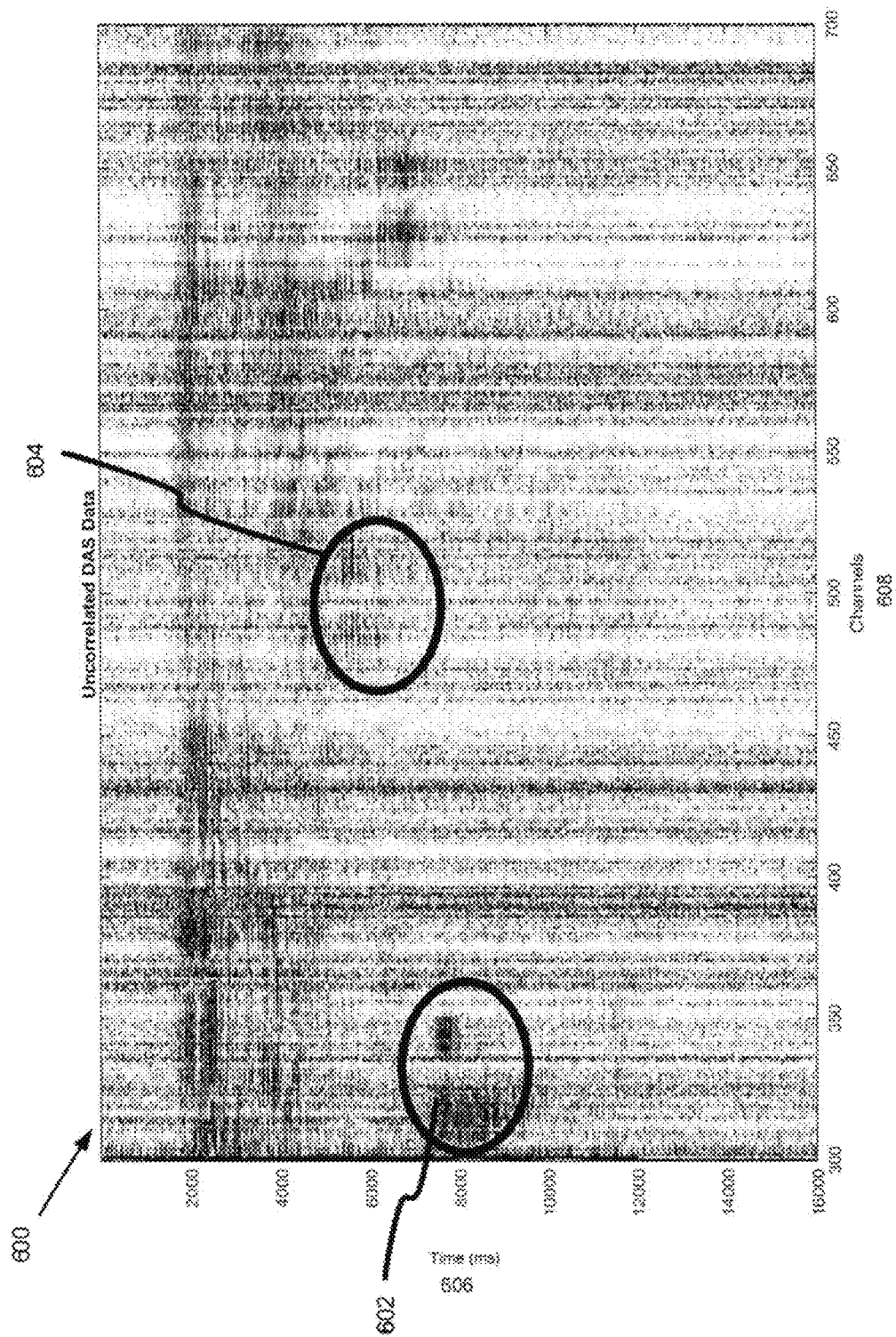
FIG. 6 depicts an example raw seismic profile with resonant noise.

FIG. 6 depicts example seismic data organized in the form of a raw seismic profile 600. The raw seismic profile 600 may indicate an intensity by which seismic waves in the geologic formation produced by the seismic source outputting acoustic energy at or near the surface of the wellbore are incident on the optical fiber. In some examples, the raw seismic profile 600 may be limited to seismic waves traveling downward and upward in the geologic formation and known as a vertical seismic profile (VSP). The raw seismic profile record 600 has a vertical axis 606 associated with time (shown in milliseconds (ms)) and a horizontal axis 608 associated with channels. Each channel may be associated with a depth in the geologic formation and indicate whether seismic waves are detected at the depth in the geologic formation. A signal amplitude in the raw seismic profile 600 at a given time and given channel indicates a response (e.g., strain) resulting from seismic waves incident on the optical fiber. This signal amplitude is represented by a gray level. For example, a high positive amplitude signal (black on plot) usually refers to a large compressional wave field amplitude and a high negative amplitude signal (white) refers to a large extensional wave field amplitude. Alternatively, the polarity of this can be reversed on the plot. The mid-color (like gray) means there is no motion on the fiber, such that black on the plot usually means the fiber is being compressed, and white on the plot means the fiber is being stretched. As another example, a color bar may be used to encode values of seismic traces. Dark colors can indicate high, positive values, light colors can indicate high, negative values, but any color scheme can be used to encode the seismic values. The seismic data may indicate detection of the seismic wave in other ways as well.

The seismic source may output acoustic energy in the form of a linear upsweep from 6 to 120 Hertz (Hz) which is 12000 ms long followed by a listening time of 4000 ms, equaling a time period of 16000 ms along the vertical axis 606. This linear upsweep is used to generate the raw seismic profile 600 shown in FIG. 6. A high amplitude monofrequency resonant noise is indicated by an alternating light gray and dark gray pattern within regions of the raw seismic profile 600 indicated by circled areas 602 and 604 resulting from the seismic waves incident on the optical fiber. The circled areas 602 and 604 show that the resonant noise is detected at certain depths indicated by the channels on the horizontal axis and at certain times indicated by the time on the vertical axis 606.

Figure 7:
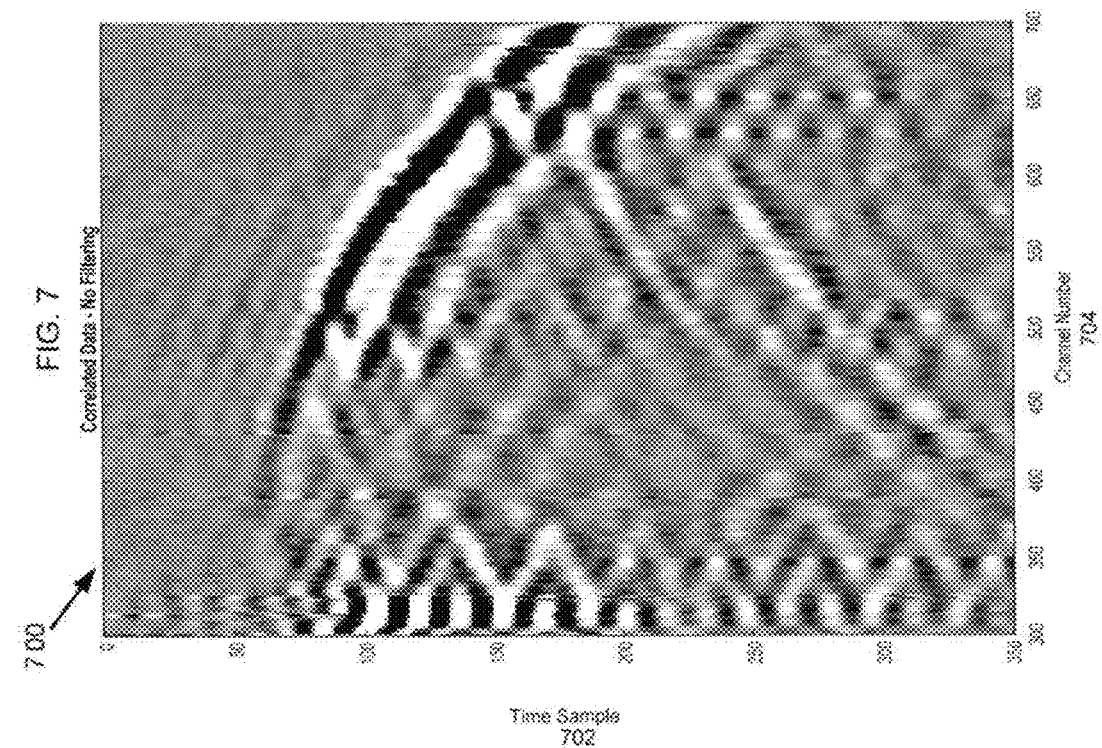
FIG. 7 depicts an example correlated seismic profile with resonant noise.

FIG. 7 depicts an example correlated seismic profile 700 produced from the raw seismic profile. The correlated seismic profile 700 has a vertical axis 702 associated with time samples and a horizontal axis 704 associated with channels. The correlated seismic profile 700 highlights the resonant noise in the form of a zig-zag pattern over time over one or more channels. Referring to the correlated seismic profile 700, resonant ringing noise is present, especially between channels: 325-360. The resonant ringing noise corresponds to the circled areas 602 and 604 depicted in the raw seismic profile 600 of FIG. 6. The correlated seismic profile 700 is generated by computing a cross correlation between the seismic data in each channel and the signal sweep used to generate the seismic data shifted by a given time lag. The cross correlation for each time lag between a minimum to maximum time lag is plotted to generate the correlated seismic profile 700 for a channel.

Embodiments disclosed herein are directed to reducing the resonant noise in the seismic data. The reduction the resonant noise in the seismic data allows for determining a noise reduced raw seismic profile which can be in turn used to determine rock properties in the geologic formation, drill the wellbore, fracture rock in the geologic formation, and/or perform perforation operations, well flooding, and/or pumping operations to recover hydrocarbon from the geologic formation. As described in further detail below, the resonant noise may be reduced exclusively using a time domain representation of the seismic data or be reduced using a frequency domain representation of the seismic data to produce a noise reduced time domain representation of the seismic data.

Time Domain Based Resonant Noise Reduction

Figure 8:
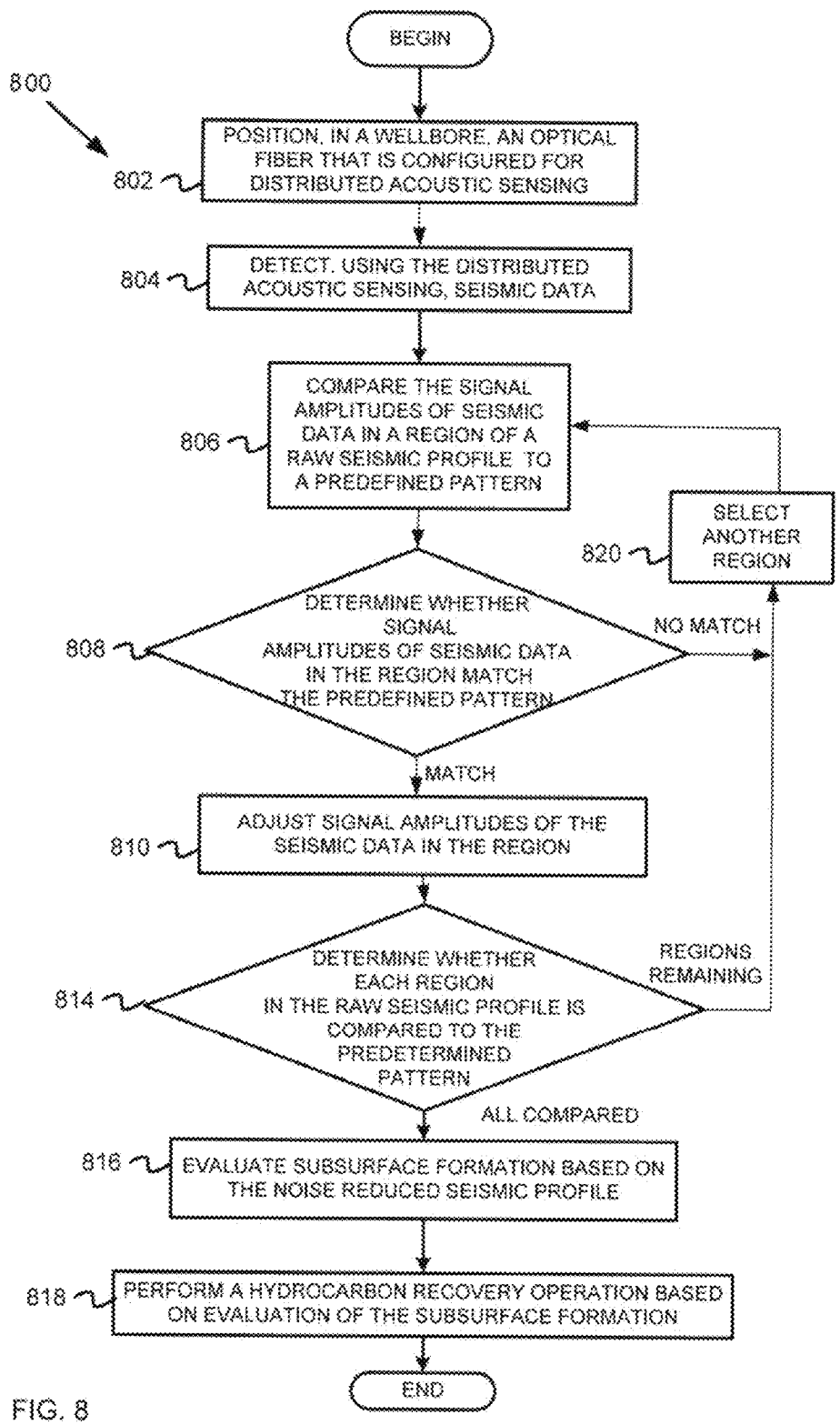
FIG. 8 depicts an example flow chart of functions for reducing in a time domain the resonant noise in the seismic data.

FIG. 8 is a flow chart of functions 800 associated with reducing the resonant noise in the time domain. The functions 800 can be performed by hardware, software, firmware, or a combination thereof. For example, at least some of the operations can be performed by a processor of the computer systems 110, 210, 310, 410 executing program code or instructions.

The resonant noise may be indicated by a varying pattern of signal amplitudes in the seismic data associated with the raw seismic profile. The reduction in the time domain may involve identifying regions in the raw seismic profile with seismic data having the varying pattern of signal amplitudes and adjusting the seismic data in those regions.

At block 802, an optical fiber associated with a DAS system is positioned in a wellbore. With reference to FIGS. 1-4, the optical fiber can be positioned within the wellbore in many ways.

At block 804, seismic data is received from the DAS system. With reference to FIGS. 1-4, seismic waves may impinge the optical fiber of the DAS system resulting in the DAS system outputting seismic data. In this example, the seismic data may be arranged in the form of a raw seismic profile.

In some examples, the seismic data is filtered. For example, the seismic data in the raw seismic profile is filtered. The filtered seismic profile enhances any resonant noise. The filtering may take the form of a median filter or some other type of filter that enhances the resonant noise. Further, the raw seismic profile (filtered or unfiltered) may be subdivided into overlapping or non-overlapping regions.

At block 806, the signal amplitudes of seismic data in a region of the raw seismic profile may be compared to a predefined pattern of signal amplitudes such as signal amplitudes associated with mono frequency sinusoidal noise. The region may be contiguous in the raw seismic profile and take a plurality of shapes.

At 808, a determination is made whether the signal amplitudes of seismic data in the region matches the predefined pattern. If the signal amplitudes in the region does not match the predefined pattern, then at block 808, the seismic data in the region may not be associated with resonant noise. At block 820, another region in the raw seismic profile selected and processing returns to block 806. The other region may or may not overlap with the earlier region. If the seismic data in the region matches the predefined pattern, then the seismic data in the region may be associated with resonant noise.

The detection of resonant noise may take other forms such as a long term versus short analysis of seismic data for a channel. A statistic like the root mean squared amplitude on a long time (LT) window (before a current time) for the seismic data for a channel can be compared to the same statistic on a short time (ST) window (after the current time) of the seismic data for a channel. If there is a significant difference in the signal characteristics, it may indicate resonant noise. An amplitude ratio of the ST/LT statistic$\gg$1 indicates a change in the seismic data, possibly resonant noise. A ST/LT$<=$1 shows no change in signal characteristic, indicating no resonant noise present. The end of this resonant noise can be found by running this process starting at the end of the signal in time and working backwards in time until the ST/LT ratio is >>1. Thus, this process can be used to detect the abnormal, or unusually large resonant frequencies in the seismic data for each channel.

At block 810, the signal amplitudes of the seismic data in the region may be adjusted. The adjustment may be to reduce signal amplitudes of the seismic data associated with the resonant noise. For example, the signal amplitudes may be muted. The signal amplitudes set to a predefined signal amplitude such as zero. As another example, the signal amplitudes may be reduced by a given fixed or variable amount. In some examples, some non-causal artifacts may be introduced by the adjustment when the adjusted seismic data in the form of the raw seismic profile is correlated. These non-causal artifacts may be reduced by tapering the signal amplitudes in the region. The tapering may involve reducing the signal amplitudes by increasing amounts from a periphery of the region to within a center of the region such that the signal amplitudes ramp down from the periphery to the center. The adjustment may take other forms as well.

At block 814, a determination is made whether seismic data in each region of the raw seismic profile has been compared to the predetermined pattern. If the seismic data in each of the regions have been compared to the predetermined pattern, then processing continues to block 816. If the seismic data in each region has not been compared to the predetermined pattern, at block 820 another region is selected then processing returns to block 806 to process another region.

At block 816, the geologic formation is evaluated based on the noise reduced raw seismic profile. For example, the noise reduced raw seismic profile may be used to determine rock properties in the geologic formation 102.

At block 818, a hydrocarbon recovery operation based on evaluation of the geologic formation can be performed. Examples of a hydrocarbon recovery operation can include fracturing, perforation operations, well flooding and/or additional drilling on the current wellbore, drilling a new wellbore, etc.

Frequency Domain Based Resonant Noise Reduction

The seismic data in the raw seismic profile may be transformed from the time domain into the frequency domain to improve detection of the resonant noise. The frequency domain representation of the seismic data is then analyzed to identify the resonant noise. Then, the resonant noise is reduced in the time domain representation of the seismic data.

Figure 9:
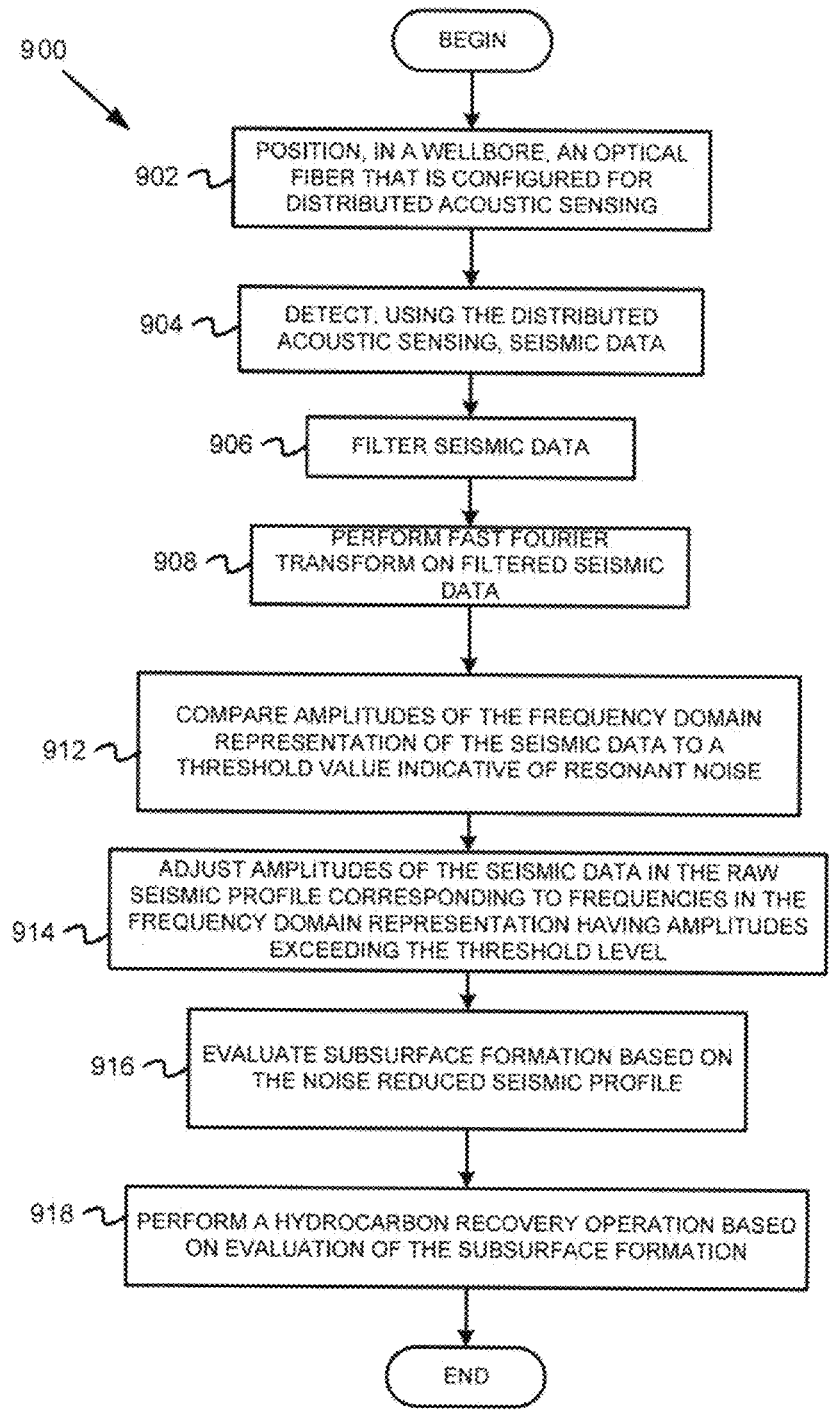
FIG. 9 depicts an example flowchart of functions for reducing in a frequency domain the resonant noise in the seismic data.

FIG. 9 depicts an example flowchart 900 of functions for reducing in a frequency domain the resonant noise. The flowchart 900 includes operations that can be performed by hardware, software, firmware, or a combination thereof. For example, at least some of the operations can be performed by a processor of the computer system 110 executing program code or instructions.

At block 902, an optical fiber associated with a DAS system is positioned in a wellbore. With reference to FIGS. 1-4, the optical fiber can be positioned within the wellbore in many ways.

At block 904, seismic data is received from the DAS system. With reference to FIGS. 1-4, seismic waves may be incident on the optical fiber of the DAS system resulting in the DAS system outputting seismic data. In this example, the seismic data may take the form of a raw seismic profile.

At block 906, the seismic data is filtered. For example, the raw seismic profile is filtered. The filtered seismic profile enhances the resonant noise. The filtering may take the form of a median filter or some other type of filter that enhances the resonant noise. In some examples, this operation may not be performed and processing continues from block 904 directly to block 908.

At block 908, a Fast Fourier Transform (FFT) is performed on the filtered seismic data (or unfiltered if block 906 is not performed) to convert the seismic data from a time domain representation of the seismic data for each channel into a frequency domain representation or frequency spectrum of the seismic data for each channel. While described in reference to FFT, other types of transforms may be used to convert the filtered seismic data from the time domain into the frequency domain.

Figure 10:
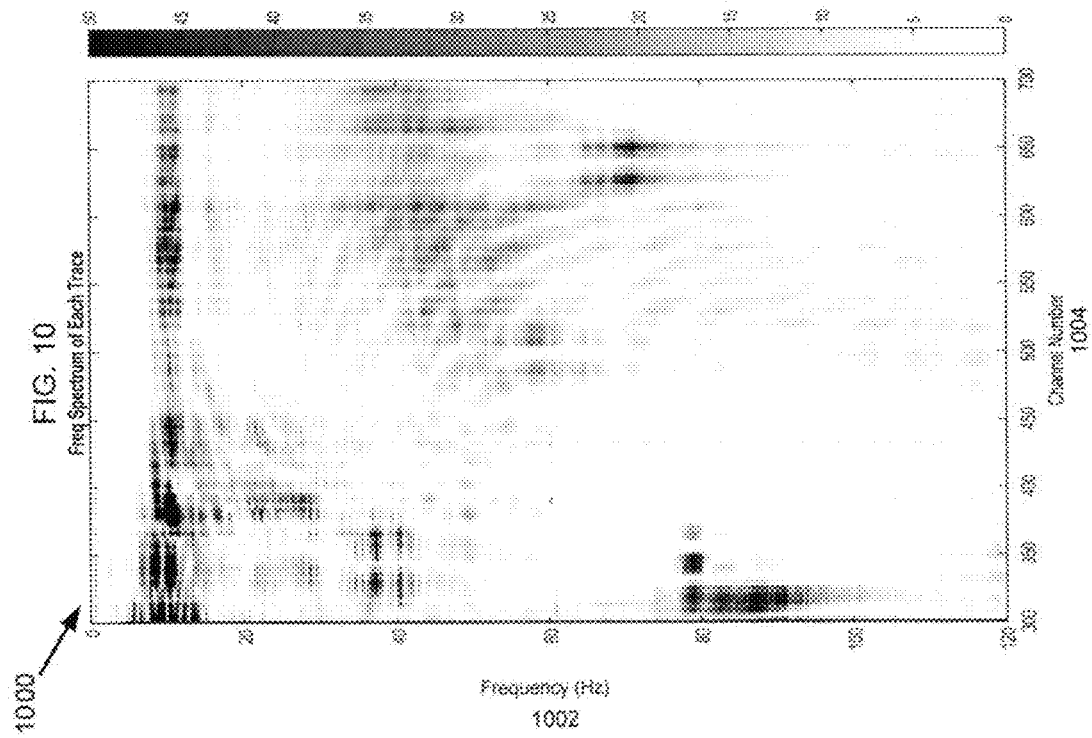
FIG. 10 depicts an example frequency domain representation of the seismic data.

FIG. 10 depicts an example frequency domain representation 1000 of the seismic data for each channel. A vertical axis 1002 is associated with a frequency of the filtered seismic data which ranges from 0 to 120 Hertz and the horizontal axis 1004 is associated with channels. A gray level in the frequency domain representation 1000 indicates an amplitude of the filtered seismic data at a given frequency and a given channel. For example, high amplitudes are shown as dark areas while low amplitudes are shown as light areas. In some examples, the amplitude may indicate power of the filtered seismic data at a given frequency and a given channel.

Referring back to FIG. 9, at block 912, amplitudes in the frequency domain representation of the seismic data are compared to a threshold value indicative of resonant noise. The regions may span one or more channels and one or more frequencies where the amplitude of seismic data in the frequency domain exceeds a threshold value. Any values greater than the threshold value may be resonant noise such as a mono-frequency sinusoidal noise.

The acoustic energy output by the seismic source is a predetermined sweep of frequencies over time. In this regard, the one or more frequencies where the amplitude of seismic data in the frequency domain exceeds the threshold value may be mapped to a period of time in the raw seismic profile when the one or more frequencies was output by the seismic source. At block 914, amplitudes of the seismic data of raw seismic profile corresponding to frequencies in the frequency domain representation having amplitudes exceeding the threshold level are adjusted in a manner similar to that described above with respect to block 810 of FIG. 8. For example, a region of seismic data in the raw seismic profile which includes at least a portion of the seismic data of raw seismic profile corresponding to frequencies in the frequency domain representation having amplitudes exceeding the threshold level are tapered or muted.

Figure 11:
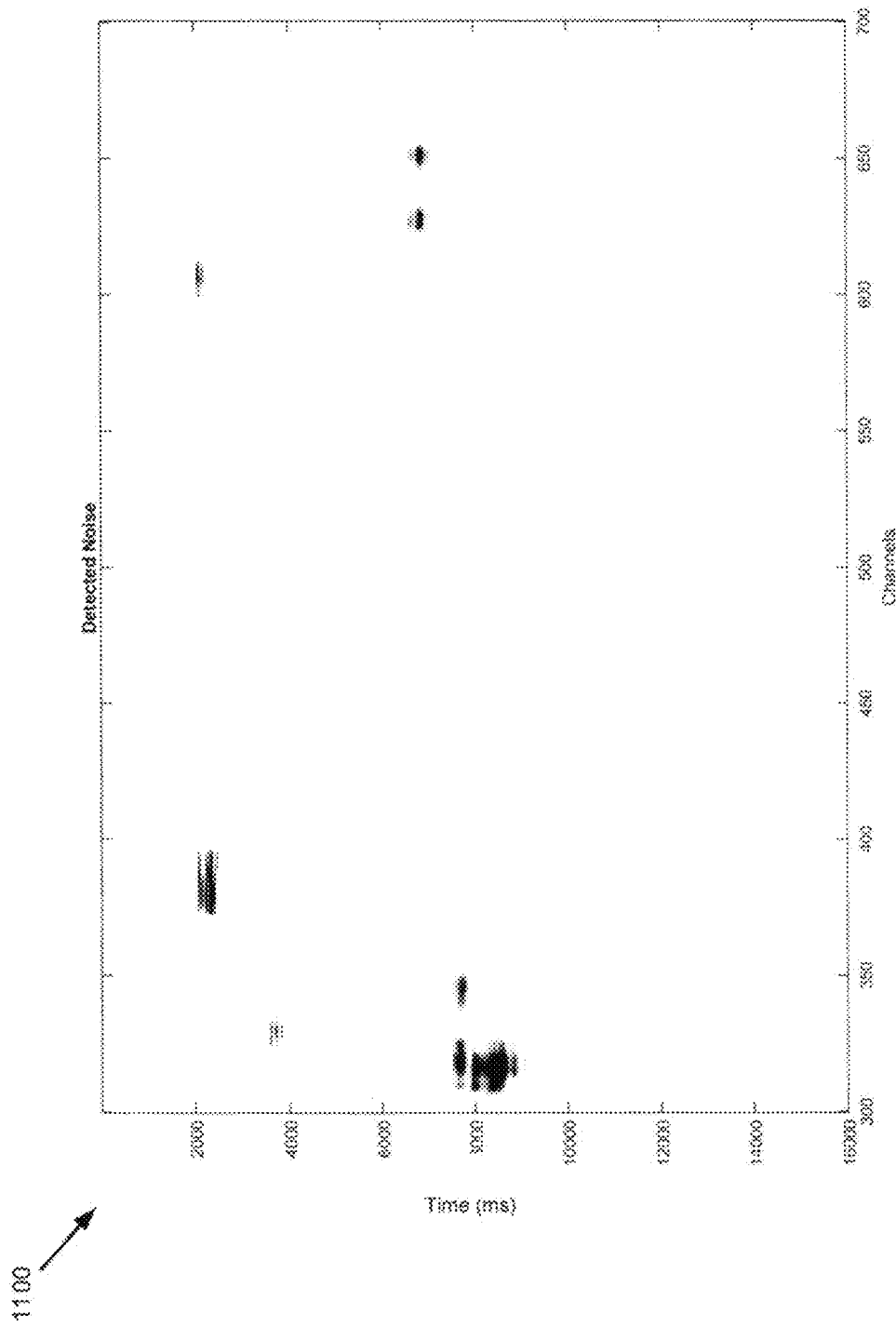
FIG. 11 depicts an example of regions of the raw seismic profile that have been adjusted.

FIG. 11 depicts an example of regions of the raw seismic profile that have been adjusted. The regions of the raw seismic profile that have been adjusted may correspond to those regions in the frequency domain representation of the seismic data where the amplitude of seismic data in the frequency domain exceeds the threshold value.

Figure 12:
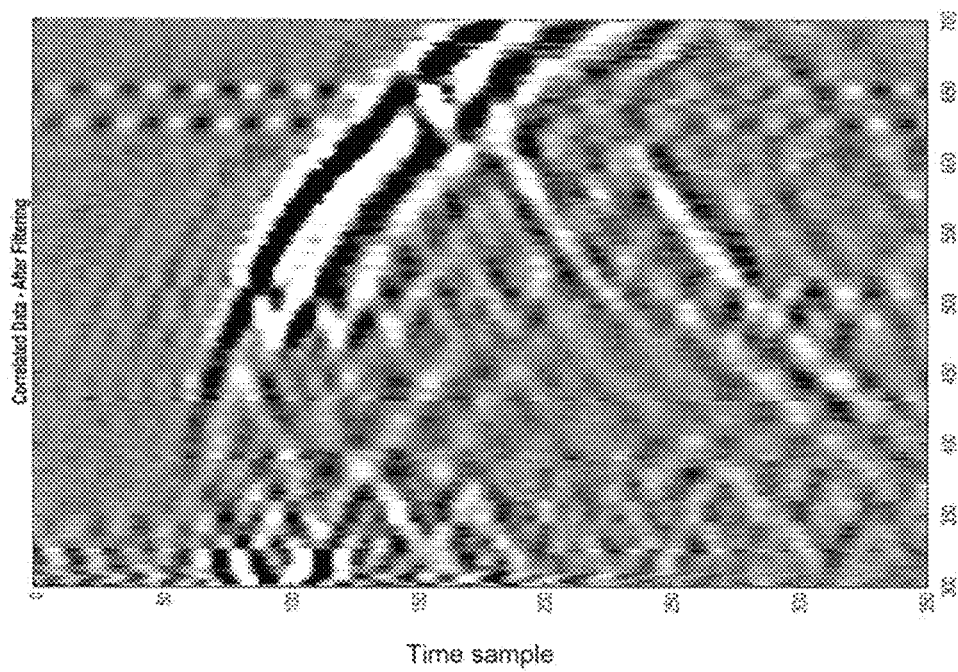
FIG. 12 depicts an example of the correlated seismic profile after the resonant noise in the seismic data is reduced.

FIG. 12 depicts an example of the correlated seismic profile after adjusting the raw seismic profile. The resonant noise has been reduced.

Figure 13:
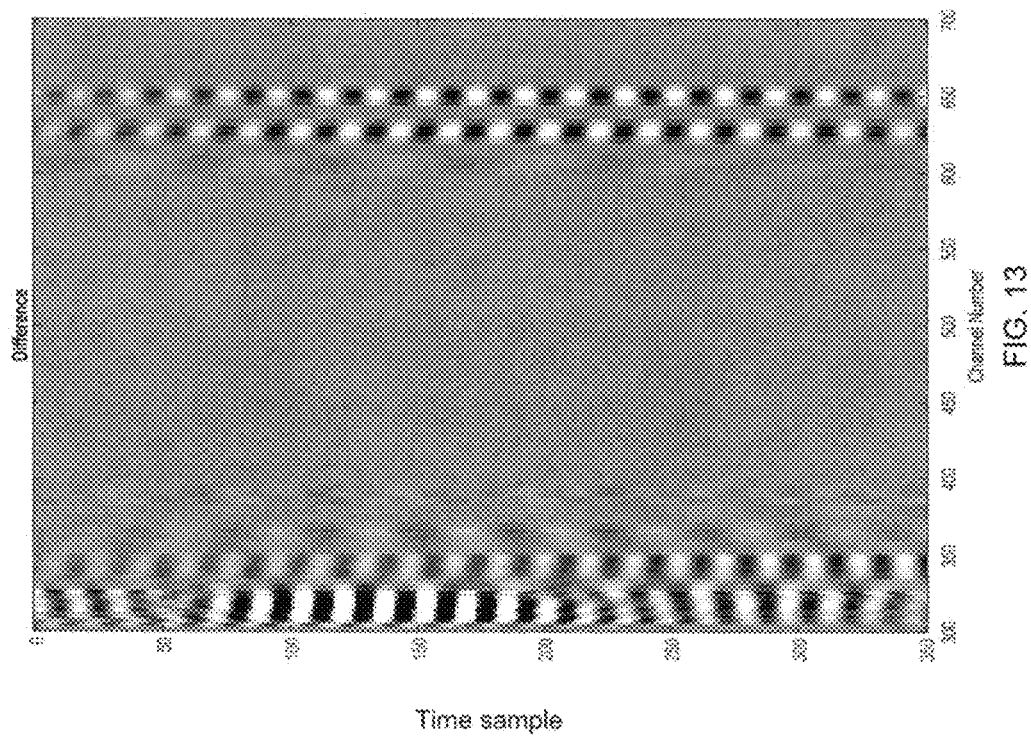
FIG. 13 depicts a difference between the noise reduced raw seismic profile and the associated correlated seismic profile to show the resonant noise reduced.

FIG. 13 depicts a difference between the noise reduced raw seismic profile in FIG. 6 and the correlated seismic profile record of FIG. 11 to show the resonant noise removed. Uniform gray levels indicate that no noise has been removed. As shown by the difference, minimal seismic data has been removed with reduction of the resonant noise.

Referring back to FIG. 9, at block 916, the geologic formation is evaluated based on the noise reduced raw seismic profile. For example, the noise reduced raw seismic profile may be used to determine rock properties in the geologic formation 102.

At block 918, a hydrocarbon recovery operation based on evaluation of the geologic formation can be performed. Examples of a hydrocarbon recovery operation can include fracturing, perforation operations, well flooding and/or additional drilling on the current wellbore, drilling a new wellbore, etc.

Instead of adjusting the resonant noise in the seismic data associated with the raw seismic profile, the resonant noise may be adjusted in the frequency domain representation of the seismic data. Then, the adjusted frequency domain representation of the seismic data may be transformed into the time domain by an inverse FFT and used to produce a resonant noise reduced raw seismic profile.

Figure 14:
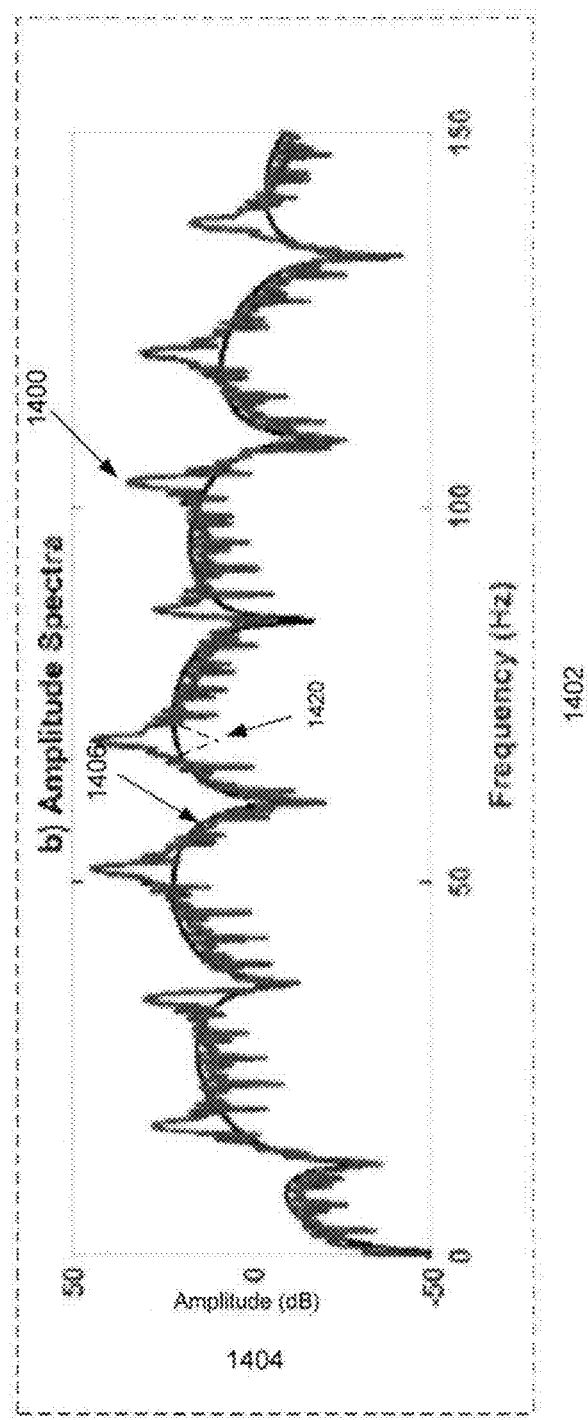
FIG. 14 is an example of a frequency domain representation of seismic data for a channel.

FIG. 14 is an example of a frequency domain representation 1400 or frequency spectrum of seismic data for a channel. Axis 1402 may indicate a frequency of the seismic data while axis 1404 may indicate an amplitude of the frequency of the seismic data. Amplitudes in the frequency domain representation 1400 may exceeds a threshold level 1406 shown as a curve but which could take other forms. These amplitudes may be adjusted. For example, the amplitudes may be set to a predefined signal amplitude such as the threshold level 1406. As another example, the amplitudes may be reduced by a given fixed or variable amount. In some situations, some non-causal artifacts may be introduced by the adjustment when the noise reduced raw seismic profile is correlated. These non-causal artifacts may be reduced by tapering the amplitudes. The tapering may involve muting and/or zeroing amplitudes where the amplitude exceeds the threshold level 1406 as shown by dotted curve 1420, and applying a ramping function at edges of the thresholded areas. In another example, the adjustment may include balancing the amplitudes in selected frequency ranges with respect to the threshold level 1406 by a filtering process to boost or suppress certain frequencies with respect to the threshold level 1406. Then, the adjusted frequency domain representation of the seismic data may be converted into the time domain by an inverse FFT. This process may be repeated for each channel of seismic data to generate the noise reduced seismic data. The geologic formation is evaluated based on a noise reduced raw seismic profile associated with the noise reduced seismic data. For example, the noise reduced raw seismic profile may be used to determine rock properties in the geologic formation and perform hydrocarbon recovery operations based on the evaluation of the geologic formation.

Example Apparatus

Figure 15:
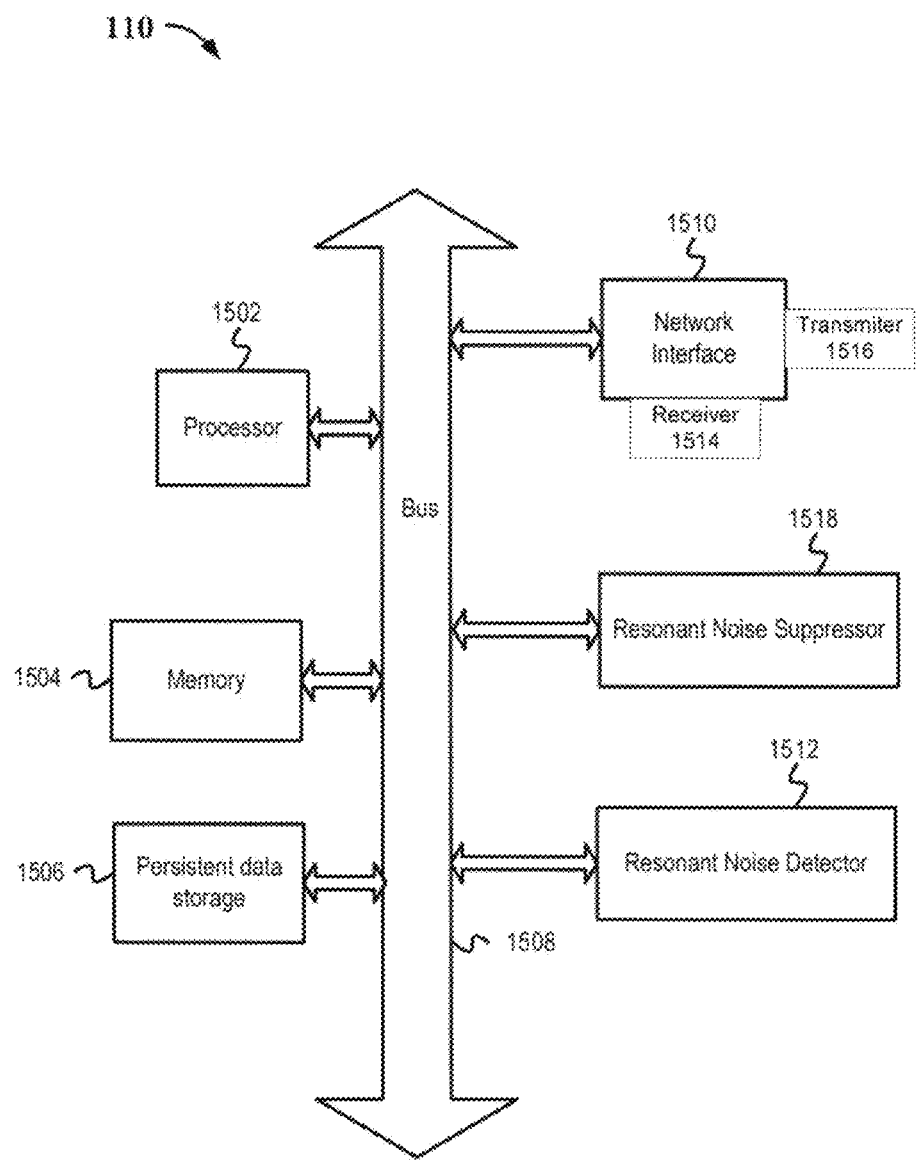
FIG. 15 is an example block diagram of the computer system for reducing resonant noise in the seismic data.

FIG. 15 depicts an example of computer system 110 associated with reducing resonant noise. The seismic data with reduced resonant noise facilitates performing formation evaluation and hydrocarbon recovery. The computer system 110 may be located on the surface, downhole, or partially on the surface and partially downhole.

The computer system 110 includes a processor 1502 (possibly including multiple processors, multiple cores, multiple nodes, and/or implementing multi-threading, etc.). The computer system 110 includes memory 1504. The memory 1504 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of non-transitory machine-readable and/or computer-readable media for storing computer instructions, program code, and/or software executable by the processor 1502.

The computer system 110 may also include persistent data storage 1506. The persistent data storage 1506 can be a hard disk drive, such as magnetic storage device which stores the seismic data. The computer system 110 also includes a bus 1508 (e.g., PCI, ISA, PCI-Express, etc.) and a network interface 1510 with at least a receiver 1514 in communication with the DAS system to receive the seismic data and a transmitter 1516 for transmitting the noise reduced seismic data to a remote location. The computer system 110 may have a resonant noise detector 1512 which detects, in a time domain or frequency domain, resonant noise and resonant noise suppressor 1518 to reduce the resonant noise in the time domain or frequency domain to generate a resonant noise reduced raw seismic profile.

The computer system 110 may implement any one of the previously described functionalities partially (or entirely) in hardware and/or software (e.g., computer code, program code, program instructions) stored on a non-transitory machine readable medium/media. In some instances, the software is executed by the processor 1502. Further, realizations can include fewer or additional components not illustrated in FIG. 15 (e.g., video cards, audio cards, additional network interfaces, peripheral devices, etc.). The processor 1502 and the memory 1504 are coupled to the bus 1508. Although illustrated as being coupled to the bus 1508, the memory 1504 can be coupled to the processor 1502.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain, or store a program for use by or in connection with an instruction execution system, apparatus, or device. A machine-readable storage medium is not a machine-readable signal medium.

A machine-readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

As used herein, the term "or" is inclusive unless otherwise explicitly noted. Thus, the phrase "at least one of A, B, or C" is satisfied by any element from the set {A, B, C} or any combination thereof, including multiples of any element.

Example Embodiments

Example embodiments include the following:

Embodiment 1 is a method, the method comprising: positioning a distributed acoustic sensor within a wellbore of a geologic formation; detecting, using the distributed acoustic sensor, seismic waves; generating a raw seismic profile of seismic data based on the detected seismic waves; detecting resonant noise in the seismic data; reducing the resonant noise in the seismic data; and outputting a resonant noise reduced raw seismic profile based on the reduction of the resonant noise in the seismic data. Reducing the resonant noise as described in any of the preceding embodiments comprises: transforming the seismic data from a time domain into a frequency domain, wherein transformed seismic data indicates a frequency spectrum of the seismic data; determining amplitudes of frequencies in the frequency spectrum which exceeds a threshold level; identifying the seismic data in the raw seismic profile which correspond to the amplitudes of the frequencies in the transformed seismic data which exceeds a threshold level, wherein the raw seismic profile is a time domain representation of the seismic data; and adjusting the identified seismic data in the raw seismic profile to reduce the resonant noise. Adjusting the identified seismic data as described in any of the preceding embodiments comprises defining a region of seismic data in the raw seismic profile which includes at least a portion of the identified seismic data and tapering the seismic data in the region. Transforming the seismic data from the time domain into the frequency domain as described in any of the preceding embodiments comprises performing a Fast Fourier Transform of the seismic data. Any of the preceding embodiments further comprises evaluating at least one characteristic of geologic formation based on the resonant noise reduced raw seismic profile. Any of the preceding embodiments further comprises performing a hydrocarbon recovery operation based on the evaluation. The raw seismic profile as described in any of the preceding embodiments is a distributed acoustic sensing (DAS) vertical seismic profile. Reducing the resonant noise as described in any of the preceding embodiments comprises: transforming the seismic data from a time domain into a frequency domain, wherein transformed seismic data indicates a frequency spectrum of the seismic data; amplitude balancing the amplitudes of frequencies in the frequency spectrum based on a threshold level to produce an amplitude balanced frequency spectrum; and transforming the amplitude balanced frequency spectrum into the time domain, wherein the transformed amplitude balanced frequency spectrum represents the resonant noise reduced raw seismic profile. Reducing the resonant noise as described in any of the preceding embodiments comprises: transforming the seismic data from a time domain into a frequency domain, wherein transformed seismic data indicates a frequency spectrum of the seismic data; determining amplitudes of frequencies in the frequency spectrum which exceed a threshold level; reducing the amplitudes of frequencies in the frequency spectrum which exceed a threshold level to produce a reduced amplitude frequency spectrum; and transforming the reduced amplitude frequency spectrum into the time domain, wherein the transformed reduced amplitude frequency spectrum represents the resonant noise reduced raw seismic profile. Detecting resonant noise in seismic data as described in any of the preceding embodiments comprises comparing seismic data in regions of the raw seismic profile to a predetermined pattern indicative of the resonant noise; and wherein reducing the resonant noise in the seismic data comprises adjusting the seismic data in the regions of the raw seismic profile which matches the predetermined pattern.

Embodiment 2 is a system, the system comprising: a distributed acoustic sensor positioned within a wellbore of a geologic formation; a processor; and a machine-readable medium having instructions stored thereon that are executable by the processor to cause the processor to, detect, by the distributed acoustic sensor positioned within the wellbore, seismic waves; generate a raw seismic profile of seismic data based on the detected seismic waves; detect resonant noise in the seismic data; reduce the resonant noise in the seismic data; and output a resonant noise reduced raw seismic profile based on the reduction of the resonant noise in the seismic data. The instructions to reduce the resonant noise as described in Embodiment 2 comprise instructions executable by the processor to cause the processor to: transform the seismic data from a time domain into a frequency domain, wherein transformed seismic data indicates a frequency spectrum of the seismic data; determine amplitudes of frequencies in the frequency spectrum which exceed a threshold level; identify the seismic data in the raw seismic profile which correspond to the amplitudes of the frequencies in the transformed seismic data which exceed a threshold level, wherein the raw seismic profile is a time domain representation of the seismic data; and adjust the identified seismic data in the raw seismic profile to reduce the resonant noise. Any of the preceding embodiments of Embodiment 2 further comprise instructions executable by the processor to cause the processor to evaluate at least one characteristic of geologic formation based on the resonant noise reduced raw seismic profile. The instructions to reduce the resonant noise as described in any of the preceding embodiments of Embodiment 2 comprise instructions executable by the processor to cause the processor to: transform the seismic data from a time domain into a frequency domain, wherein transformed seismic data indicates a frequency spectrum of the seismic data; amplitude balance the amplitudes of frequencies in the frequency spectrum based on a threshold level to produce an amplitude balanced frequency spectrum; and transform the amplitude balanced frequency spectrum into the time domain, wherein the transformed amplitude balanced frequency spectrum represents the resonant noise reduced raw seismic profile. The instructions to reduce the resonant noise as described in any of the preceding embodiments of Embodiment 2 comprise instructions executable by the processor to cause the processor to: transform the seismic data from a time domain into a frequency domain, wherein transformed seismic data indicates a frequency spectrum of the seismic data; determine amplitudes of frequencies in the frequency spectrum which exceed a threshold level; reduce the amplitudes of frequencies in the frequency spectrum which exceed a threshold level to produce a reduced amplitude frequency spectrum; and transform the reduced amplitude frequency spectrum into the time domain, wherein the transformed reduced amplitude frequency spectrum represents the resonant noise reduced raw seismic profile. The instructions to detect the resonant noise in seismic data as described in any of the preceding embodiments of Embodiment 2 comprises instructions executable by the processor to cause the processor to compare seismic data in regions of the raw seismic profile to a predetermined pattern indicative of the resonant noise; and wherein the instructions to reduce the resonant noise in the seismic data comprises instructions executable by the processor to cause the processor to adjust the seismic data in the regions of the raw seismic profile which matches the predetermined pattern.

Embodiment 3 is non-transitory computer readable media comprising computer instructions executable by a processor for performing the functions of: detecting, by a distributed acoustic sensor positioned within a wellbore of a geologic formation, seismic waves; generating a raw seismic profile of seismic data based on the detected seismic waves; detecting resonant noise in the seismic data; reducing the resonant noise in the seismic data; and outputting a resonant noise reduced raw seismic profile based on the reduction of the resonant noise in the seismic data. The instructions to reduce the resonant noise as described in any of the preceding embodiments of Embodiment 3 comprise instructions executable by the processor to cause the processor to: transform the seismic data from a time domain into a frequency domain, wherein transformed seismic data indicates a frequency spectrum of the seismic data; determine amplitudes of frequencies in the frequency spectrum which exceed a threshold level; identify the seismic data in the raw seismic profile which correspond to the amplitudes of the frequencies in the transformed seismic data which exceed a threshold level, wherein the raw seismic profile is a time domain representation of the seismic data; and adjust the identified seismic data in the raw seismic profile to reduce the resonant noise. The instructions to reduce the resonant noise as described in any of the preceding embodiments of Embodiment 3 comprise instructions executable by the processor to cause the processor to: transform the seismic data from a time domain into a frequency domain, wherein transformed seismic data indicates a frequency spectrum of the seismic data; amplitude balance the amplitudes of frequencies in the frequency spectrum based on a threshold level to produce an amplitude balanced frequency spectrum; and transform the amplitude balanced frequency spectrum into the time domain, wherein the transformed amplitude balanced frequency spectrum represents the resonant noise reduced raw seismic profile. The instructions to detect the resonant noise in seismic data as described in any of the preceding embodiments of Embodiment 3 comprises instructions executable by the processor to cause the processor to compare seismic data in regions of the raw seismic profile to a predetermined pattern indicative of the resonant noise; and wherein the instructions to reduce the resonant noise in the seismic data comprises instructions executable by the processor to cause the processor to adjust the seismic data in the regions of the raw seismic profile which matches the predetermined pattern.

What is claimed is:
1. A method comprising:
positioning a distributed acoustic sensor within a wellbore of a geologic formation;
detecting, by the distributed acoustic sensor, seismic waves;
generating a raw seismic profile of seismic data based on the detected seismic waves;
detecting resonant noise in the seismic data, wherein detecting the resonant noise in the seismic data comprises comparing signal amplitudes of the seismic data in regions of the raw seismic profile to a predetermined pattern indicative of the resonant noise;
reducing the resonant noise in the seismic data; and
outputting a resonant noise reduced raw seismic profile based on the reduction of the resonant noise in the seismic data.

2. The method of claim 1, wherein reducing the resonant noise comprises:
transforming the seismic data from a time domain into a frequency domain, wherein the transformed seismic data indicates a frequency spectrum of the seismic data;
determining amplitudes of frequencies in the frequency spectrum which exceeds a threshold level;
identifying the seismic data in the raw seismic profile which correspond to the amplitudes of the frequencies in the transformed seismic data which exceeds the threshold level, wherein the raw seismic profile is a time domain representation of the seismic data; and
adjusting the identified seismic data in the raw seismic profile to reduce the resonant noise.

3. The method of claim 2, wherein adjusting the identified seismic data comprises defining a region of the seismic data in the raw seismic profile which includes at least a portion of the identified seismic data and tapering the seismic data in the region.

4. The method of claim 2, wherein transforming the seismic data from the time domain into the frequency domain comprises performing a Fast Fourier Transform of the seismic data.

5. The method of claim 1, further comprising evaluating at least one characteristic of the geologic formation based on the resonant noise reduced raw seismic profile.

6. The method of claim 5, further comprising performing a hydrocarbon recovery operation based on the evaluation.

7. The method of claim 1, wherein the raw seismic profile is a distributed acoustic sensing (DAS) vertical seismic profile.

8. The method of claim 1, wherein reducing the resonant noise comprises:
transforming the seismic data from a time domain into a frequency domain, wherein the transformed seismic data indicates a frequency spectrum of the seismic data;
amplitude balancing amplitudes of frequencies in the frequency spectrum based on a threshold level to produce an amplitude balanced frequency spectrum; and
transforming the amplitude balanced frequency spectrum into the time domain, wherein the transformed amplitude balanced frequency spectrum represents the resonant noise reduced raw seismic profile.

9. The method of claim 1, wherein reducing the resonant noise comprises:
transforming the seismic data from a time domain into a frequency domain, wherein the transformed seismic data indicates a frequency spectrum of the seismic data;
determining amplitudes of frequencies in the frequency spectrum which exceed a threshold level;
reducing the amplitudes of frequencies in the frequency spectrum which exceed the threshold level to produce a reduced amplitude frequency spectrum" to provide appropriate antecedence basis; and
transforming the reduced amplitude frequency spectrum into the time domain, wherein the transformed reduced amplitude frequency spectrum represents the resonant noise reduced raw seismic profile.

10. The method of claim 1, wherein reducing the resonant noise in the seismic data comprises adjusting the seismic data in the regions of the raw seismic profile which matches the predetermined pattern.

11. A system comprising:
a distributed acoustic sensor positioned within a wellbore of a geologic formation;
a processor; and
a machine-readable medium having instructions stored thereon that are executable by the processor to cause the processor to:
detect, by the distributed acoustic sensor positioned within the wellbore, seismic waves;
generate a raw seismic profile of seismic data based on the detected seismic waves;
detect resonant noise in the seismic data, wherein the instructions to detect the resonant noise in the seismic data comprises comparing signal amplitudes of the seismic data in regions of the raw seismic profile to a predetermined pattern indicative of the resonant noise;
reduce the resonant noise in the seismic data; and
output a resonant noise reduced raw seismic profile based on the reduction of the resonant noise in the seismic data.

12. The system of claim 11, wherein the instructions to reduce the resonant noise comprise instructions executable by the processor to cause the processor to:
transform the seismic data from a time domain into a frequency domain, wherein the transformed seismic data indicates a frequency spectrum of the seismic data;
determine amplitudes of frequencies in the frequency spectrum which exceed a threshold level;
identify the seismic data in the raw seismic profile which correspond to the amplitudes of the frequencies in the transformed seismic data which exceed the threshold level, wherein the raw seismic profile is a time domain representation of the seismic data; and
adjust the identified seismic data in the raw seismic profile to reduce the resonant noise.

13. The system of claim 11, further comprising instructions executable by the processor to cause the processor to evaluate at least one characteristic of the geologic formation based on the resonant noise reduced raw seismic profile" to provide appropriate antecedence basis.

14. The system of claim 11, wherein the instructions to reduce the resonant noise comprise instructions executable by the processor to cause the processor to:
transform the seismic data from a time domain into a frequency domain, wherein the transformed seismic data indicates a frequency spectrum of the seismic data;
amplitude balance amplitudes of frequencies in the frequency spectrum based on a threshold level to produce an amplitude balanced frequency spectrum; and
transform the amplitude balanced frequency spectrum into the time domain, wherein the transformed amplitude balanced frequency spectrum represents the resonant noise reduced raw seismic profile.

15. The system of claim 11, wherein the instructions to reduce the resonant noise comprise instructions executable by the processor to cause the processor to:
transform the seismic data from a time domain into a frequency domain, wherein the transformed seismic data indicates a frequency spectrum of the seismic data;
determine amplitudes of frequencies in the frequency spectrum which exceed a threshold level;

reduce the amplitudes of frequencies in the frequency spectrum which exceed the threshold level to produce a reduced amplitude frequency spectrum; and transform the reduced amplitude frequency spectrum into the time domain, wherein the transformed reduced amplitude frequency spectrum represents the resonant noise reduced raw seismic profile.

16. The system of claim 11, wherein the instructions to reduce the resonant noise in the seismic data comprises instructions executable by the processor to cause the processor to adjust the seismic data in the regions of the raw seismic profile which matches the predetermined pattern.

17. A non-transitory computer readable media comprising computer instructions executable by a processor for performing functions of:

detecting, by a distributed acoustic sensor positioned within a wellbore of a geologic formation, seismic waves;

generating a raw seismic profile of seismic data based on the detected seismic waves;

detecting resonant noise in the seismic data, wherein detecting the resonant noise in the seismic data comprises" to provide appropriate antecedence basis comparing signal amplitudes of the seismic data in regions of the raw seismic profile to a predetermined pattern indicative of the resonant noise;

reducing the resonant noise in the seismic data; and outputting a resonant noise reduced raw seismic profile based on the reduction of the resonant noise in the seismic data.

18. The non-transitory computer readable media of claim 17, wherein the instructions to reduce the resonant noise comprise instructions executable by the processor to cause the processor to:

transform the seismic data from a time domain into a frequency domain, wherein the transformed seismic data indicates a frequency spectrum of the seismic data;

determine amplitudes of frequencies in the frequency spectrum which exceed a threshold level;

identify the seismic data in the raw seismic profile which correspond to the amplitudes of the frequencies in the transformed seismic data which exceed the threshold level, wherein the raw seismic profile is a time domain representation of the seismic data; and adjust the identified seismic data in the raw seismic profile to reduce the resonant noise.

19. The non-transitory computer readable media of claim 17, wherein the instructions to reduce the resonant noise comprise instructions executable by the processor to cause the processor to:

transform the seismic data from a time domain into a frequency domain, wherein the transformed seismic data indicates a frequency spectrum of the seismic data;

amplitude balance amplitudes of frequencies in the frequency spectrum which exceed a threshold level to produce an amplitude balanced frequency spectrum; and transform the amplitude balanced frequency spectrum into the time domain, wherein the transformed amplitude balanced frequency spectrum represents the resonant noise reduced raw seismic profile.

20. The non-transitory computer readable media of claim 17, wherein the instructions to reduce the resonant noise in the seismic data comprises instructions executable by the processor to cause the processor to adjust the seismic data in the regions of the raw seismic profile which matches the predetermined pattern.

* * * * *